(12) United States Patent
Iou et al.

(10) Patent No.: US 9,200,479 B2
(45) Date of Patent: Dec. 1, 2015

(54) CONTINUOUS PANEL FRAME WITH HANGING ARM

(71) Applicants: Hsin-Chi Iou, Taoyuan County (TW); Chien-Wei Chang, Taoyuan County (TW)

(72) Inventors: Hsin-Chi Iou, Taoyuan County (TW); Chien-Wei Chang, Taoyuan County (TW)

(*) Notice: Subject to any disclaimer, the term of this patent is extended or adjusted under 35 U.S.C. 154(b) by 133 days.

(21) Appl. No.: 13/956,851

(22) Filed: Aug. 1, 2013

(65) Prior Publication Data
US 2015/0033505 A1 Feb. 5, 2015

(51) Int. Cl.
*C25D 17/06* (2006.01)
*E05D 15/06* (2006.01)
*B65G 17/20* (2006.01)
*C25D 17/28* (2006.01)
*B61B 13/06* (2006.01)

(52) U.S. Cl.
CPC ............ *E05D 15/0621* (2013.01); *B61B 13/06* (2013.01); *B65G 17/20* (2013.01); *C25D 17/06* (2013.01); *C25D 17/28* (2013.01)

(58) Field of Classification Search
CPC ........ C25D 17/06; C25D 17/28; B65G 17/20; B61B 13/06
See application file for complete search history.

(56) References Cited

U.S. PATENT DOCUMENTS

| 5,755,495 A * | 5/1998 | Cook et al. .................... 305/122 |
| 7,214,022 B2 * | 5/2007 | Melching ...................... 414/277 |
| 2013/0001073 A1 * | 1/2013 | Noda et al. ................. 204/275.1 |

FOREIGN PATENT DOCUMENTS

| JP | 2003013296 A | * | 1/2003 |
| JP | 2009132956 A | * | 6/2009 |

* cited by examiner

*Primary Examiner* — Gerald McClain
(74) *Attorney, Agent, or Firm* — Rosenberg, Klein & Lee (57) ABSTRACT

A continuous panel frame that includes a sliding platform that uses rail members and sliding seats to continuously and stably move a vertical panel frame, dust free, in a nanometer precision wet manufacturing process.

4 Claims, 8 Drawing Sheets

CONTINUOUS PANEL FRAME WITH HANGING ARM

BACKGROUND OF THE INVENTION

1. Field of the Invention

The invention relates to panel frame and more particularly to a continuous panel frame having rail elements sliding seats for continuously moving the vertical panel frame.

2. Description of the Related Art

Figure 1:
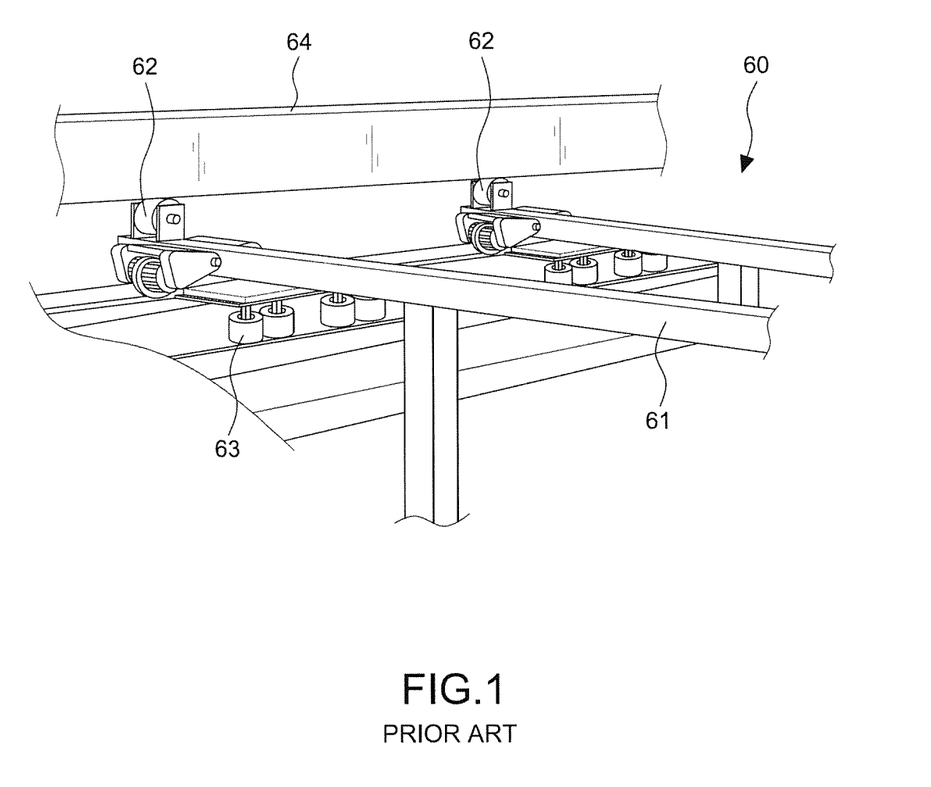
FIG. 1 is a schematic view of a portion of a conventional continuous panel frame for electroplating.

A conventional continuous panel frame 60 for electroplating is shown in FIG. 1 and comprises a plurality of parallel transverse bars 61 each including an upper roller 62 rotatably engaged with a bottom of a longitudinal pressing bar 64, and a plurality of lower rollers 63 rotatably disposed on a lower member. Thus, the continuous panel frame 60 may move.

However, there are a number of drawbacks in above continuous panel frame 60. For example, the rollers 62, 63 tend to wear after a short period time of use. Further, the continuous panel frame 60 may abnormally displace laterally, i.e., along X-axis and thus is not aligned with the longitudinal pressing bar 64, i.e., not aligned along Y-axis. The conventional continuous panel frame 60 is applicable to electroplating having precision of millimeters only rather than electroplating having precision more than millimeters such as wet manufacturing processes of nanometer precision.

Thus, the need for improvement still exists.

SUMMARY OF THE INVENTION

It is a primary object of the present invention to provide a continuous panel frame to use rail members and sliding seats for continuously moving the vertical panel frame in order to avoid dust in wet manufacturing processes, and enhance the precision of the continuous wet manufacturing processes, meeting the need of wet manufacturing processes of nanometer precision.

It is another object of the present invention to provide a continuous panel frame for stable movement of the sliding platform and for connecting to other rails to change the movement direction.

In order to achieve the above objects, a continuous panel frame comprises: a support; at least two rail elements transversely arranged on the support; at least four sliding seats separately arranged on the rail elements; a sliding platform across arranged on the sliding seats, having at least four ends of the bottom edges fixed to the sliding seats and connected to a sliding power to linearly move on the rail elements; and a panel frame connected to the sliding platform by a hanging arm to be hanged and moved with the sliding platform.

Based on the features disclosed, the sliding seat corresponding to a contact surface of the rail element has polymer composites materials.

Further, the hanging arm in an L-shaped has a horizontal portion fixed to the sliding platform and a vertical portion fixed to the panel frame; the panel frame has a dust-proof cover.

The above and other objects, features and advantages of the invention will become apparent from the following detailed description taken with the accompanying drawings.

DETAILED DESCRIPTION OF THE PREFERRED EMBODIMENT

Referring to FIGS. 2 to 9, the preferred embodiment of a continuous panel frame in accordance with the present invention comprises the following components as discussed in detail below.

Figure 2:
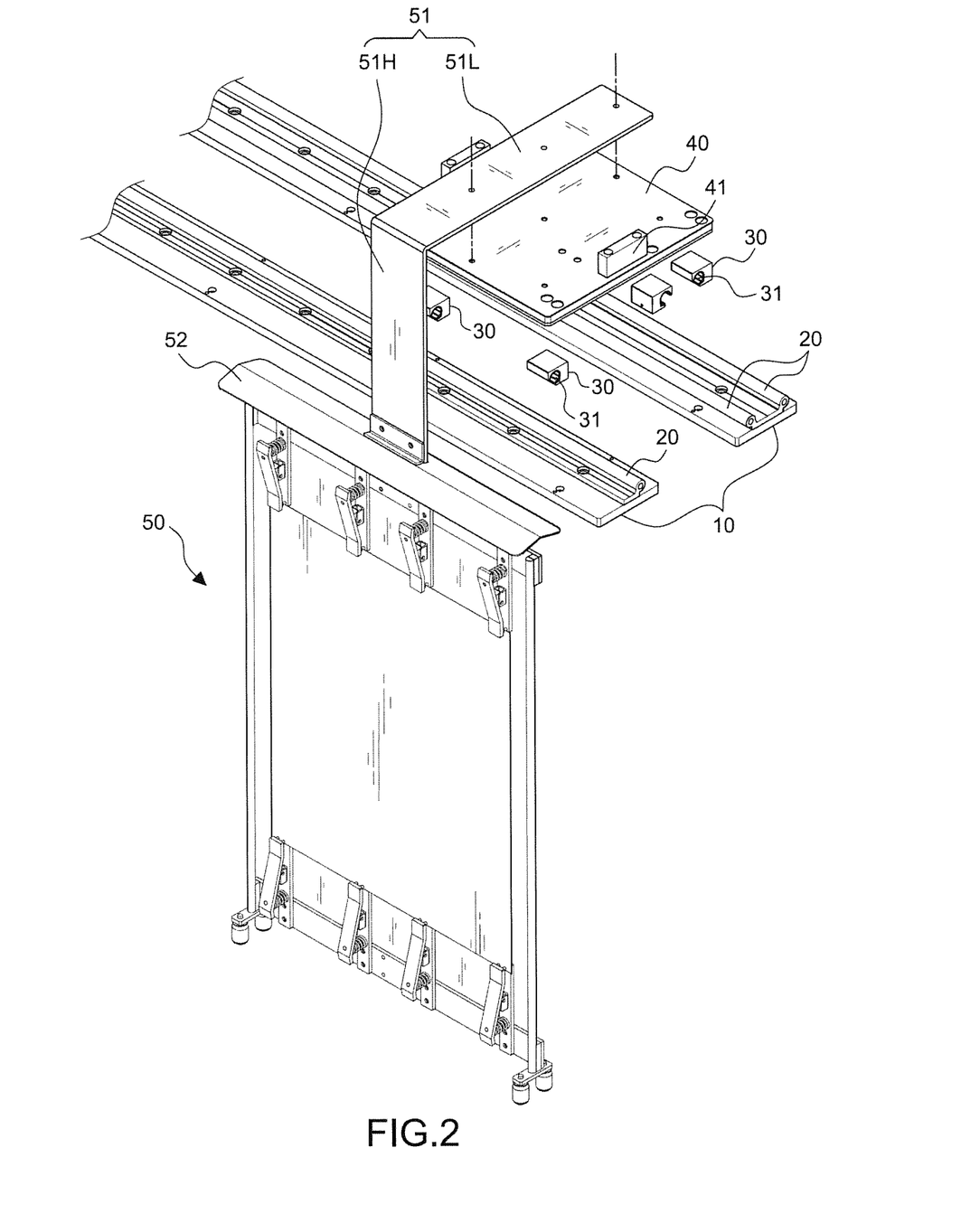
FIG. 2 is an exploded perspective view of the preferred embodiment in accordance with the present invention.
Figure 3:
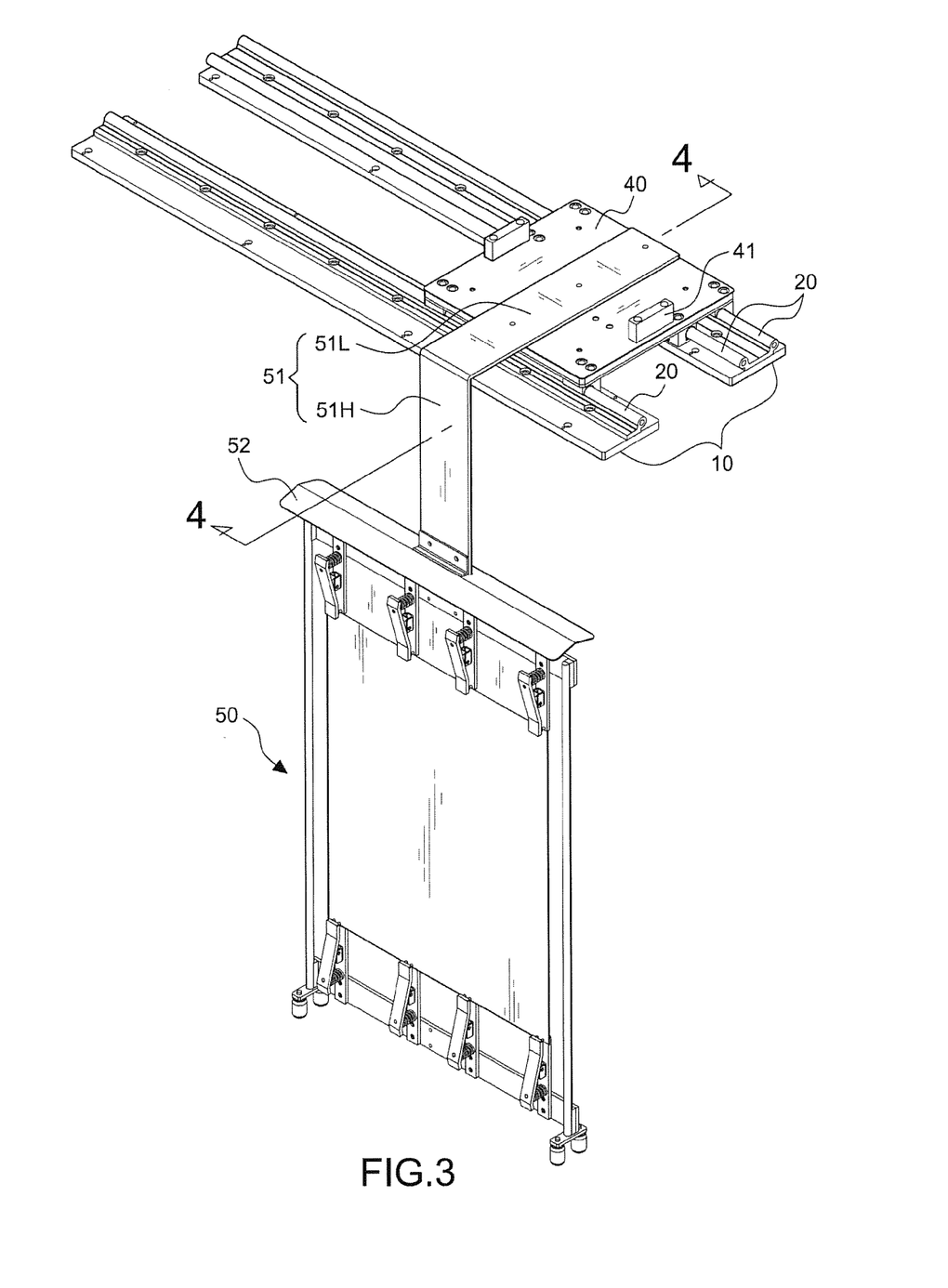
FIG. 3 is a perspective view of the preferred embodiment in accordance with the present invention.
Figure 4:
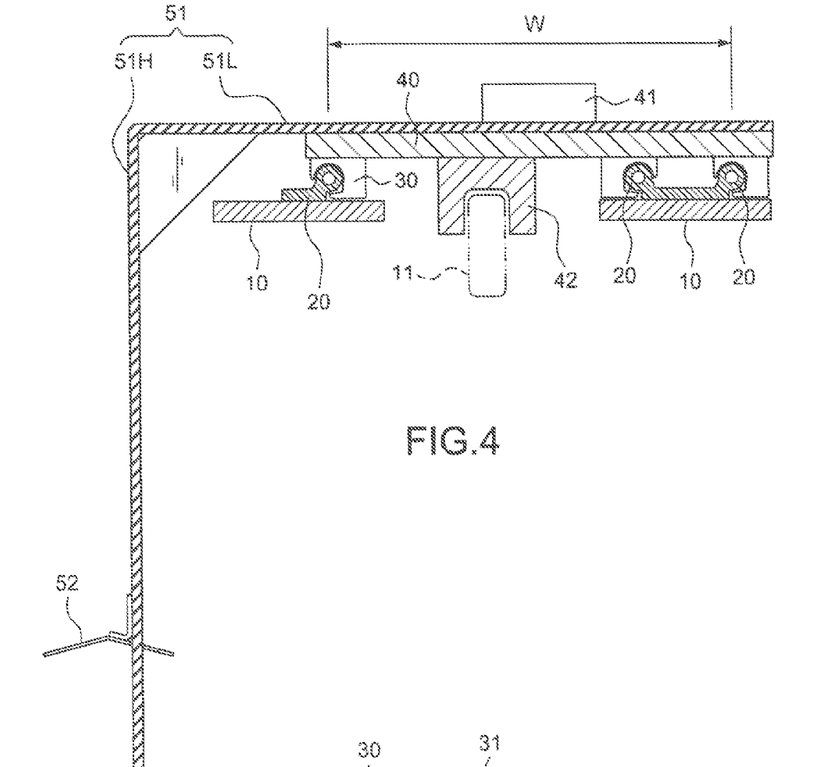
FIG. 4 is cross-sectional view taken along the line 4-4 in FIG. 3.

A support 10 includes at least two rail elements 20 transversely arranged on the support 10. In the embodiment, three rail elements are provided but it is not a limitation. At least four sliding seats 30 are separately arranged on the rail elements 20. A sliding platform 40 is across arranged on the sliding seats 30, has at least four ends of the bottom edges fixed to the sliding seats 30 and is connected to a sliding power 11 to linearly move on the rail elements 20. In the embodiment, the sliding seat 30 corresponding to a contact surface of the rail element 20 has polymer composites materials 31. The polymer composites materials have properties of stronger, lighter, high-temperature resistance, etc. Thus, the sliding seat 30 can slide on the rail element 20 for a long period of time without being malfunctioned.

A panel frame 50 is connected to the sliding platform 40 by a hanging arm 51 to be hanged and moved with the sliding platform 40. In the embodiment, the hanging arm 51 in an L-shaped has a horizontal portion 51L fixed to the sliding platform 40 and a vertical portion 51H fixed to the panel frame 50, and the panel frame 50 has a dust-proof cover 52 secured to a bottom end of the vertical portion 51H. Thus, the panel frame 50 can be disposed vertically. This is particularly important because the panel frame 50 can be positioned in a tank 53 for wet manufacturing processes.

Further, the sliding power 11 may be a transmission chain connected to a connected block 42 at a bottom of the sliding platform 40. A pushing block 41 is arranged at a front and rear ends of a top of the sliding platform 40.

Figure 5:
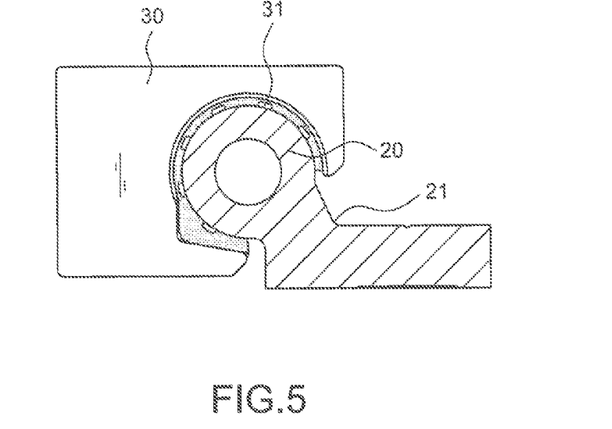
FIG. 5 is an enlarged view of the rail element and the sliding seat shown in FIG. 4.

As shown in FIG. 5, the rail element 20 has a projection 21 and a circular section but not limited to so that the polymer composites materials 31 of the sliding seat 30 may smoothly ride on the rail element 20, achieving the best performance and stability and effectively avoiding friction dust which affects the quality of wet manufacturing processes.

Figure 6:
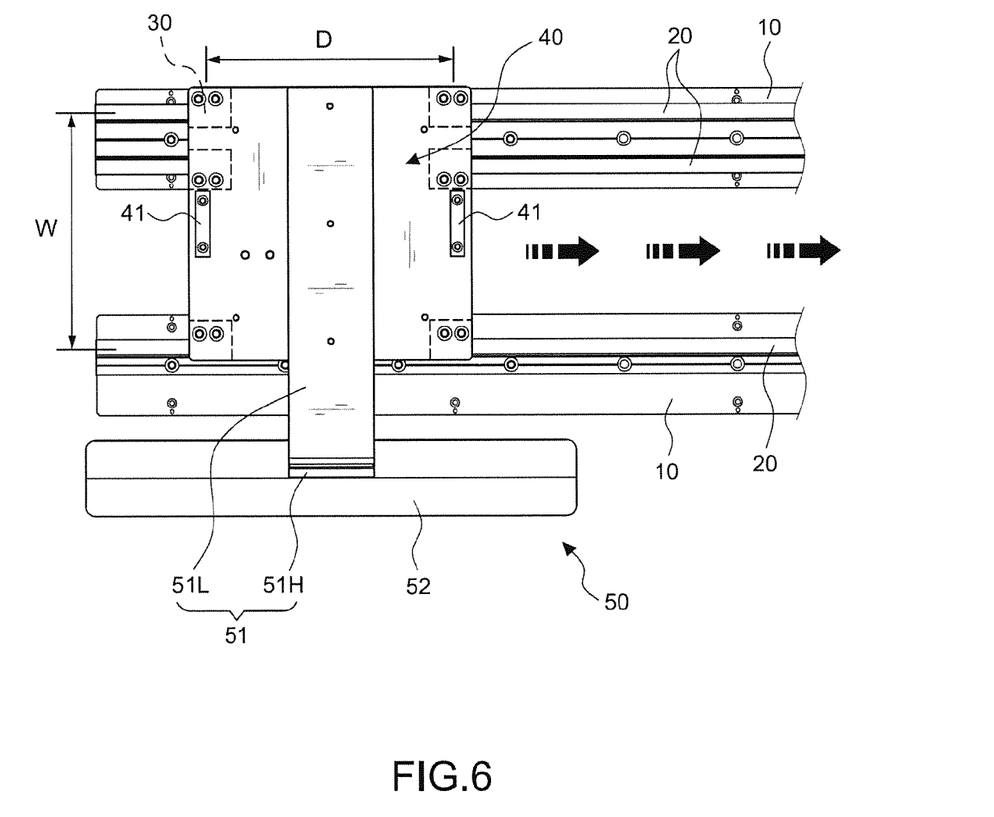
FIG. 6 is a top view of the present invention.
Figure 7:
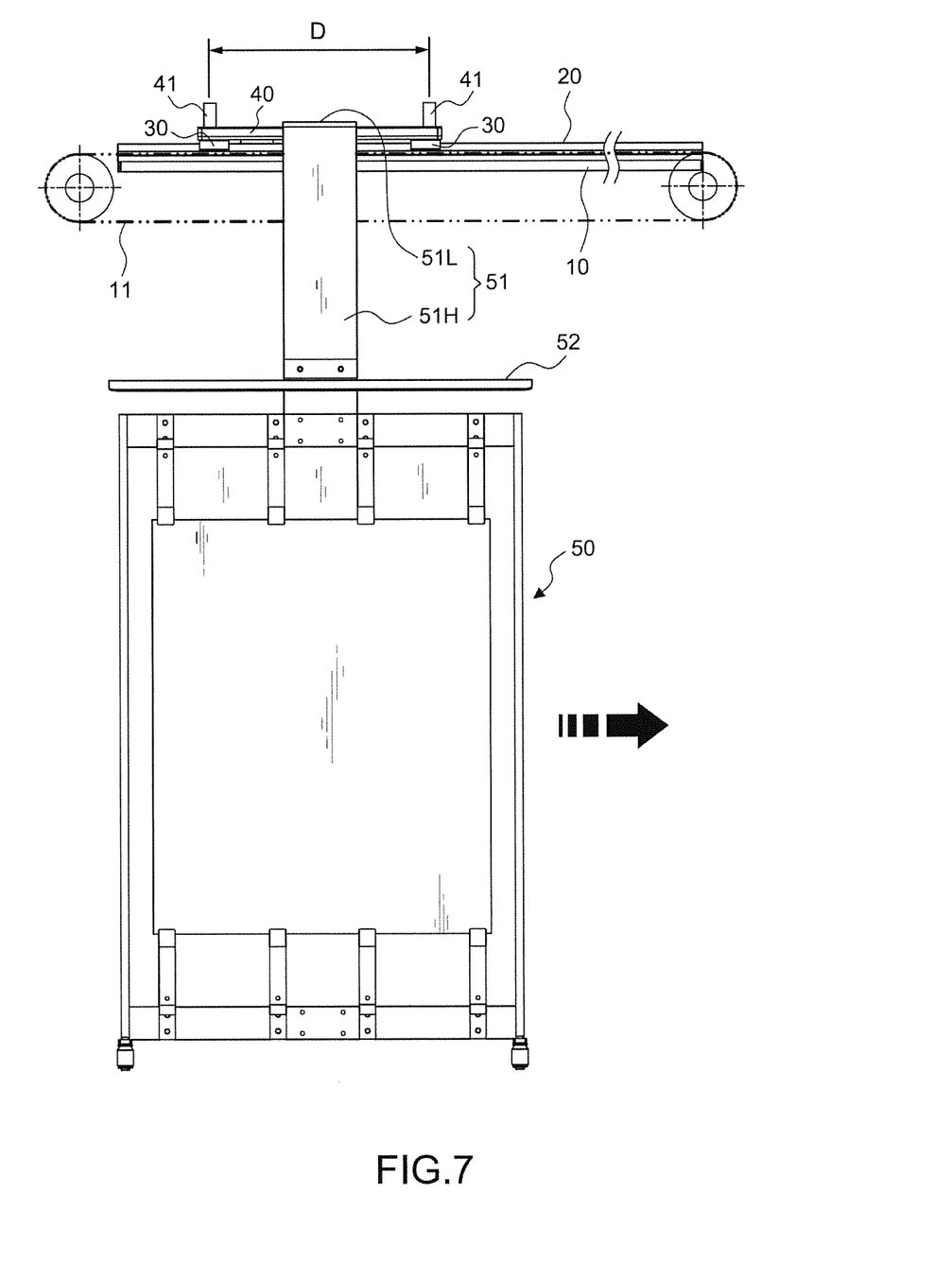
FIG. 7 is a front view of the present invention.
Figure 8:
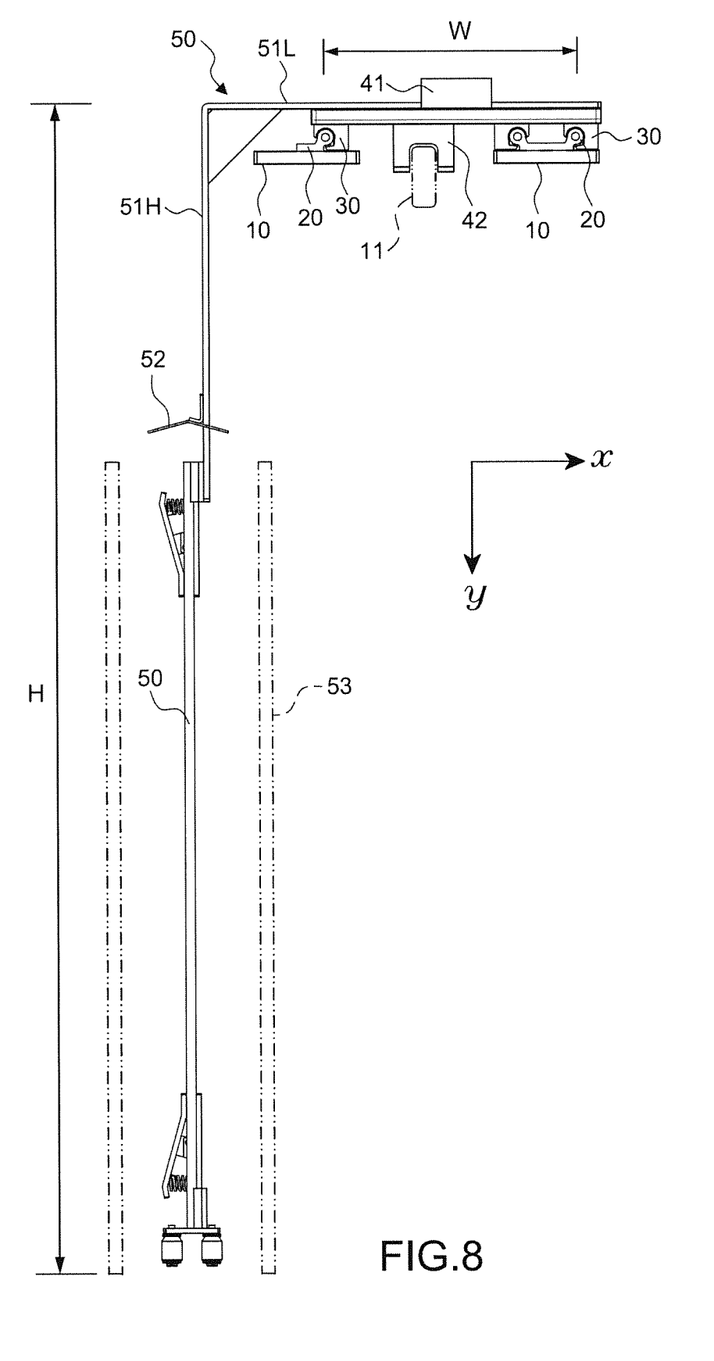
FIG. 8 is a side elevation of the present invention.

In the invention, width W between the sliding seats 30 on the rail element 20 is about 30-40 cm and distance D between t the sliding seats 30 on the rail element 20 is also 30-40 cm but it is not a limitation.

Figure 9:
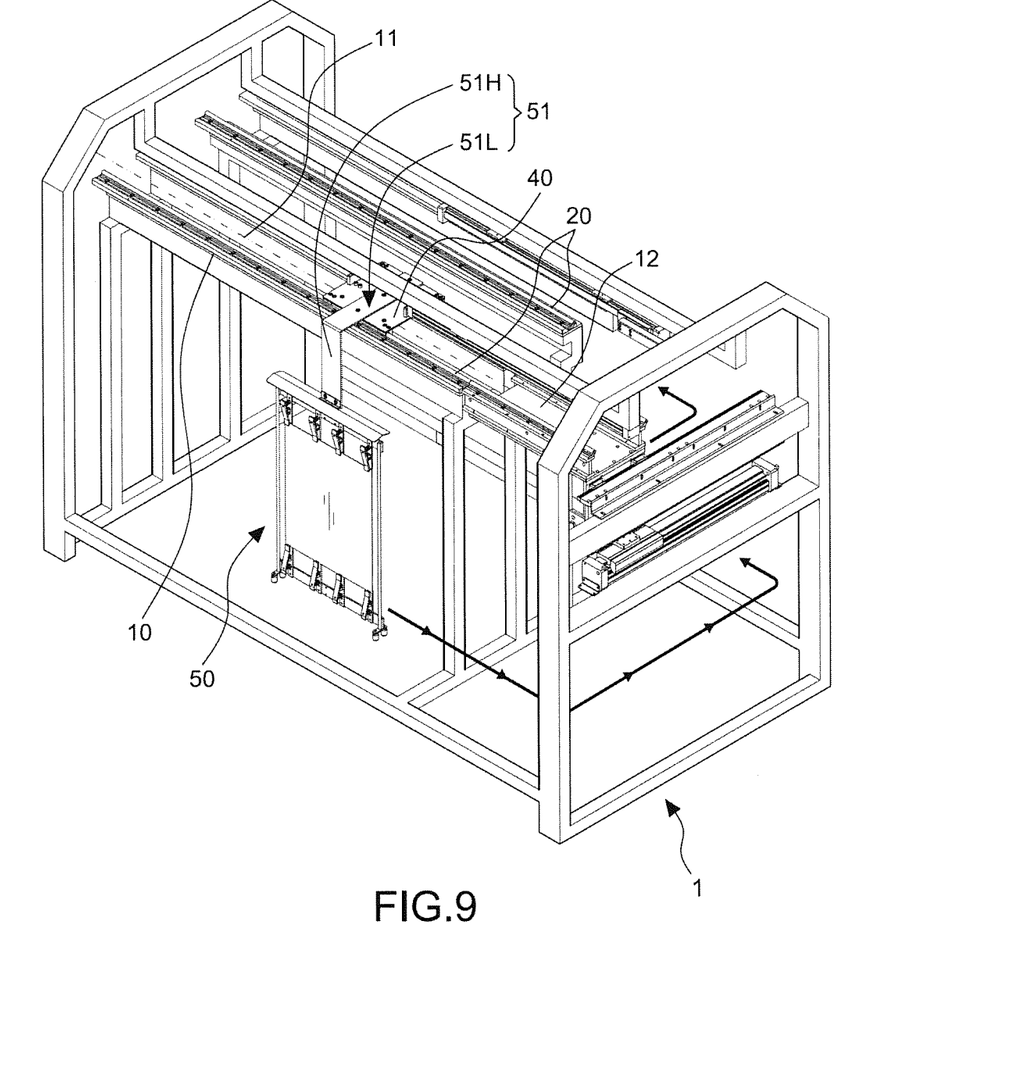
FIG. 9 is an application example of the present invention.

As shown in FIG. 9, the present invention applying to a panel frame carrier 1 comprises a transformed platform 12 for carrying both the sliding platform 40 and the panel frame 50 to another rail behind the rail elements 20 and engaging with one end of the rail. Thus, both the sliding platform 40 and the panel frame 50 can be moved from the front rail to the rear rail by the transformed platform 12, having continuous and smooth operation of the wet manufacturing processes.

While the invention has been described in terms of preferred embodiments, those skilled in the art will recognize that the invention can be practiced with modifications within the spirit and scope of the appended claims.

What is claimed is:

1. A continuous panel frame, comprising:
a pair of longitudinal support members;
a rail element disposed on each of said support members;
at least four sliding seats separately arranged on the rail elements;
a sliding platform having opposing first and second surfaces, said sliding seats coupled to opposed portions of said first surface of said sliding platform, and an intermediate portion of said first surface of said sliding platform coupled to a sliding power to linearly move on the rail elements;
an L-shaped hanging arm having a first portion coupled to said second surface of said sliding platform; and
a panel frame connected to a second portion of said hanging arm to be movable with the sliding platform; wherein a projection of at least one of the rail elements passes through a circumferential surface of said sliding seat.

2. The continuous panel frame as claimed in claim 1, wherein the sliding seat corresponding to a contact surface of the rail element has polymer composites materials.

3. The continuous panel frame as claimed in claim 1, wherein the first portion of the hanging arm is a horizontal portion fixed to the sliding platform and the second portion is a vertical portion fixed to the panel frame.

4. The continuous panel frame as claimed in claim 3, wherein the panel frame has a dust-proof cover.

\* \* \* \* \*